United States Patent
Stamires et al.

(10) Patent No.: US 6,503,867 B1
(45) Date of Patent: *Jan. 7, 2003

(54) QUASI-CRYSTALLINE BOEHMITES CONTAINING ADDITIVES

(75) Inventors: Dennis Stamires, Newport Beach, CA (US); Paul O'Connor, Hoevelaken (NL); Gregory Pearson, Seabrook, TX (US); William Jones, Cambridge (GB)

(73) Assignee: Akzo Nobel N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/636,690

(22) Filed: Aug. 11, 2000

Related U.S. Application Data

(63) Continuation-in-part of application No. 09/372,558, filed on Aug. 11, 1999, now abandoned.

(51) Int. Cl.[7] .......................... B01J 23/00; B01J 27/14; B01J 21/08; C04B 35/03; C01F 7/02
(52) U.S. Cl. .................. 502/335; 502/202; 502/208; 502/232; 502/302; 502/341; 502/351; 502/355; 501/127; 423/275; 423/600; 423/625; 423/628; 423/629
(58) Field of Search ............................. 502/335, 302, 502/341, 351, 355, 202, 208, 232; 501/127; 423/600, 625, 628, 629, 275

(56) References Cited

U.S. PATENT DOCUMENTS

| | | | |
|---|---|---|---|
| 3,357,791 A | | 12/1967 | Napier ........................... 23/143 |
| 3,669,904 A | * | 6/1972 | Cornelius et al. ............ 252/465 |
| 4,117,105 A | | 9/1978 | Hertzenberg et al. ....... 423/625 |
| 4,248,852 A | * | 2/1981 | Wakabayashi et al. ...... 423/626 |
| 4,318,896 A | * | 3/1982 | Schoonover ................. 423/628 |
| 4,344,928 A | * | 8/1982 | Dupin et al. ................. 423/626 |
| 4,379,134 A | * | 4/1983 | Weber et al. ................ 423/626 |
| 4,676,928 A | * | 6/1987 | Leach et al. ............. 252/313.1 |
| 4,797,139 A | | 1/1989 | Bauer ........................... 51/293 |
| 5,194,243 A | | 3/1993 | Pearson et al. .............. 423/625 |
| 5,219,806 A | * | 6/1993 | Wood .......................... 501/127 |
| 5,681,658 A | * | 10/1997 | Anderson et al. ........... 428/403 |
| 5,718,879 A | | 2/1998 | Chopin et al. .............. 423/628 |
| 5,800,797 A | * | 9/1998 | Matsumoto et al. ........ 423/625 |
| 5,837,634 A | * | 11/1998 | McLaughlin et al. ....... 501/127 |
| 5,972,820 A | * | 10/1999 | Kharas et al. ............... 501/127 |
| 6,027,706 A | * | 2/2000 | Pinnavaia et al. ........... 423/600 |
| 6,043,187 A | * | 3/2000 | Harle et al. ................. 502/313 |
| 6,262,132 B1 | * | 7/2001 | Singleton et al. ........... 518/715 |

FOREIGN PATENT DOCUMENTS

| | | | |
|---|---|---|---|
| EP | 0 130 835 A2 | 1/1985 | ............ B01J/23/00 |
| EP | 0 597 738 A1 | 5/1994 | ............ C04B/35/10 |

OTHER PUBLICATIONS

Japanese Abstract No.: JP–08 268716 Oct. 1996 (Pub. Date).
Derwent Abstract No.: JP 02 920255 Jul. 1999.
Derwent Abstract No.: JP 11 189409 Jul. 1999.
Derwent Abstract No.: JP 57 088075 Jun. 1982.
J. Medena, J. Catalysis, vol. 37, 91–100 (Mar. 1974).
J. Wachowski, et al., Materials Chemistry, vol. 37 (1994), 29–38 (Jul. 1993).
G. Yamaguchi, et al., Bull. Chem. Soc. Jap., vol. 32 (1959), 696–699 Month not avail.
G. Yamaguchi, et al., J. Chem. Soc. Jap., (Ind. Chem. Soc.), (1963), English Translation, 21 pages, Jan. 1963.

* cited by examiner

*Primary Examiner*—Mark L. Bell
*Assistant Examiner*—Patricia L. Hailey
(74) *Attorney, Agent, or Firm*—Louis A. Morris

(57) ABSTRACT

The present invention pertains to a quasi-crystalline boehmite containing additive in a homogeneously dispersed state. Suitable additives are compounds containing elements selected from the group of alkaline earth metals, alkaline metals, transition metals, actinides, silicon, gallium, boron, titanium, and phosphorus. Said QCBs according to the invention may be prepared in several ways. In general, a quasi-crystalline boehmite precursor and an additive are converted to a quasi-crystalline boehmite containing the additive in a homogeneously dispersed state.

22 Claims, 4 Drawing Sheets

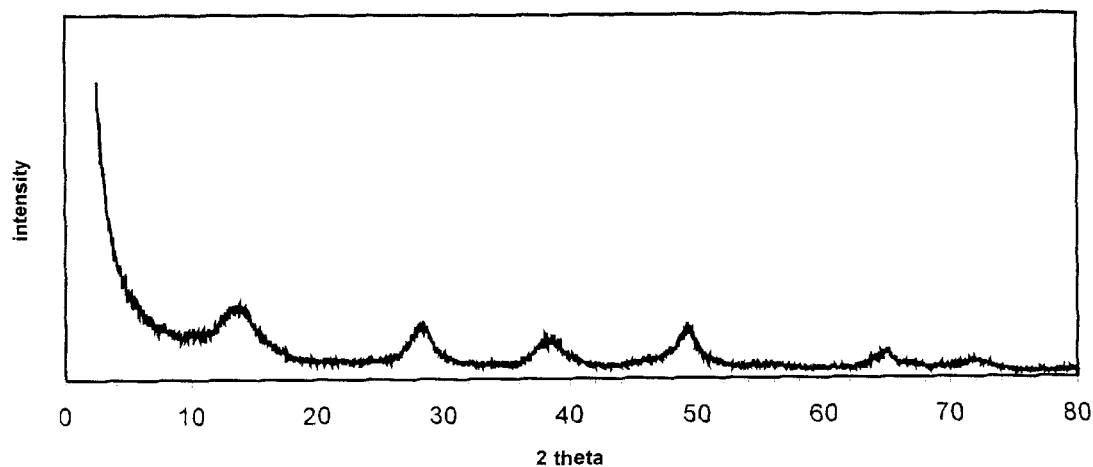
Figure 1. XRD of Catapal
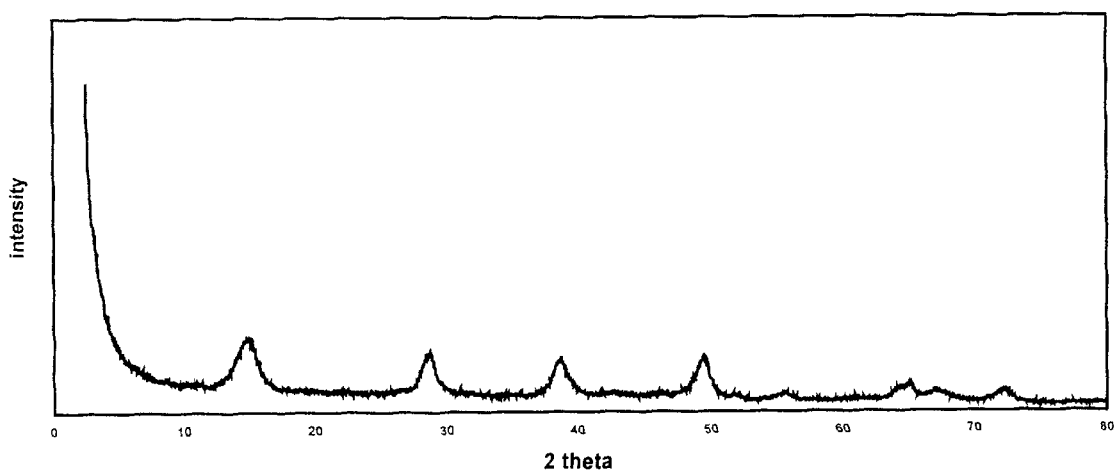
Figure 2 QCB with Zn

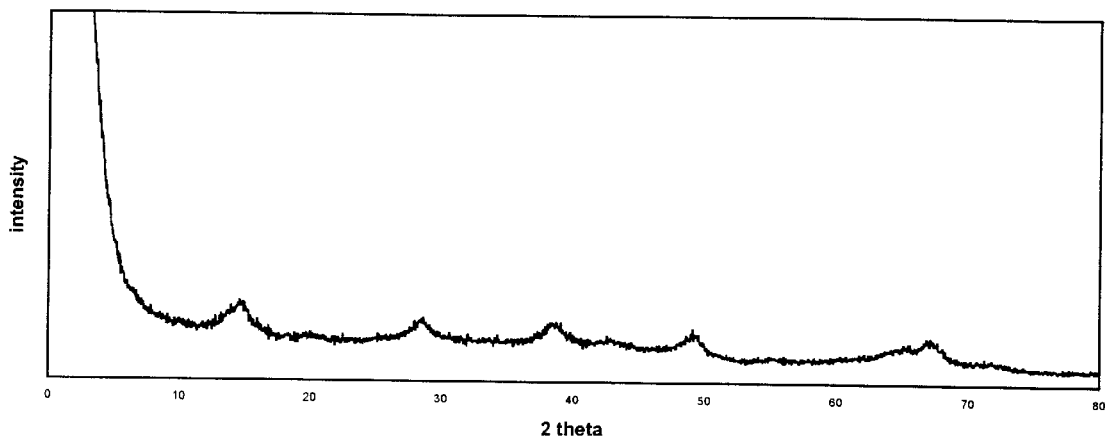
Figure 3 QCB with Si
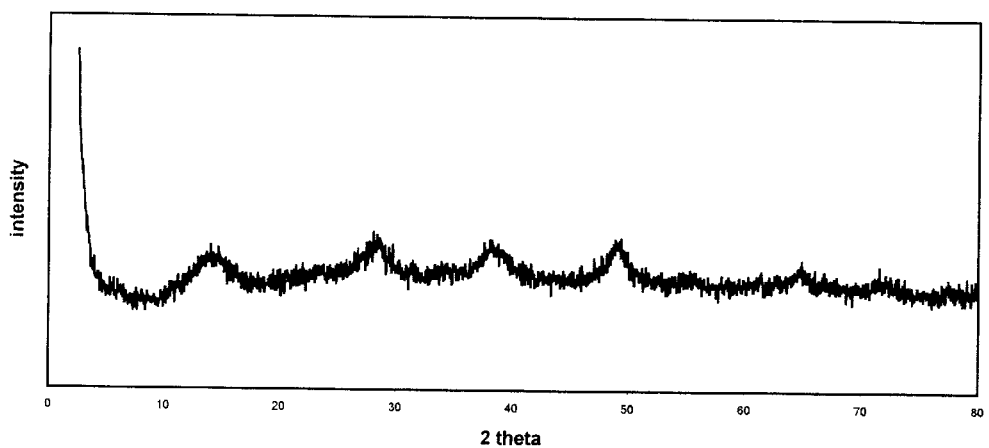
Figure 4 QCB with Ni and Co

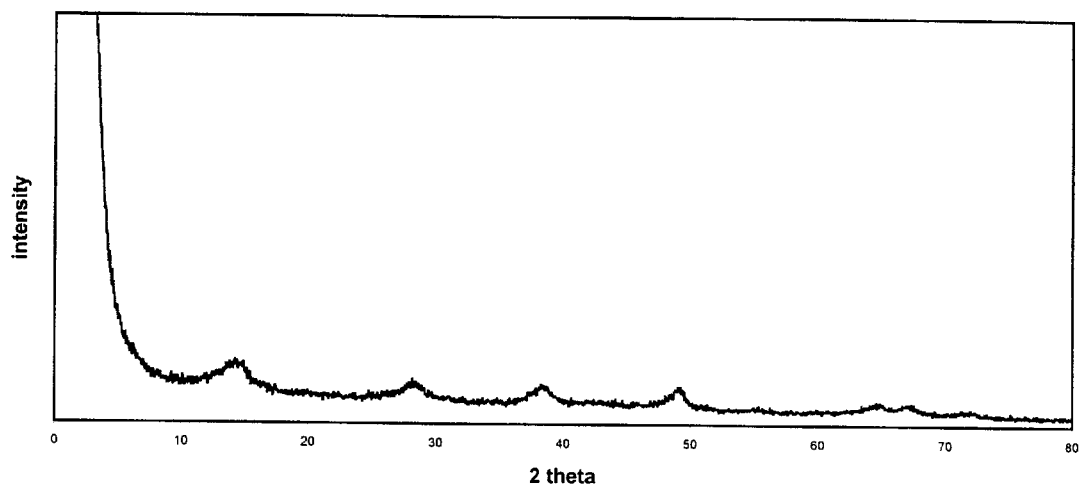
Figure 5 QCB with Mo
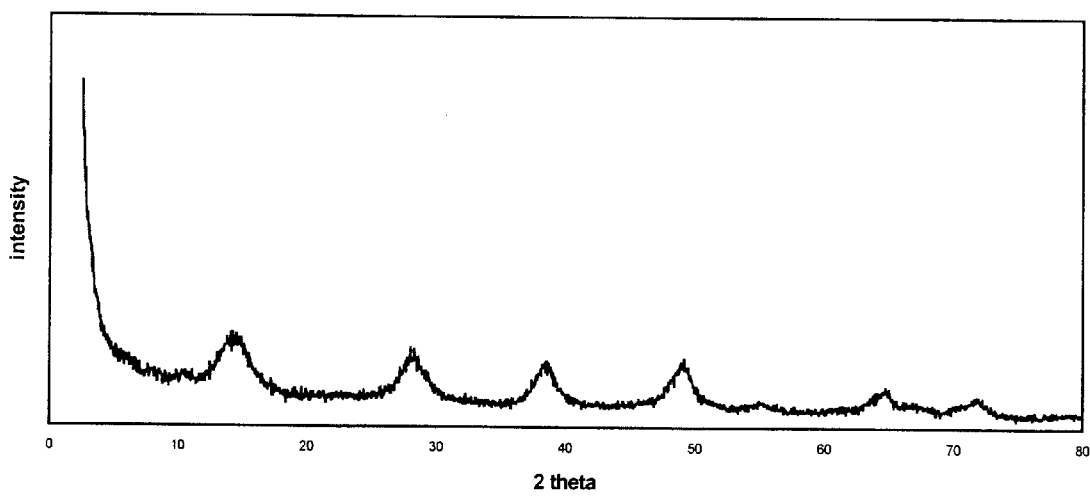
Figure 6 QCB with Ga

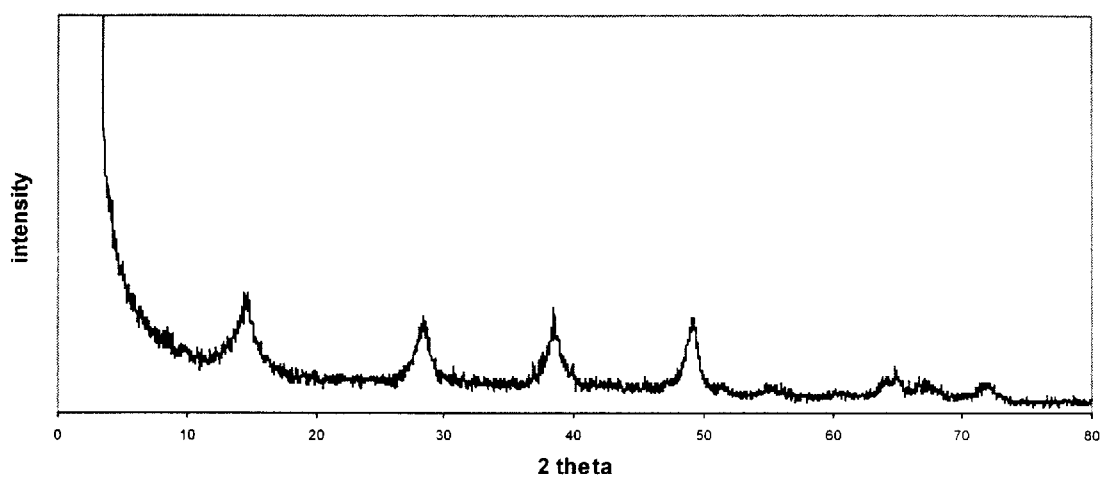
Figure 7 QCB with Ba

QUASI-CRYSTALLINE BOEHMITES CONTAINING ADDITIVES

CROSS REFERENCE TO RELATED APPLICATIONS

This application is a continuation-in-part of U.S. application Ser. No. 09/372,558, filed Aug. 11, 1999, now abandoned.

BACKGROUND OF THE INVENTION

1. Field of the Invention

The present invention pertains to quasi-crystalline boehmites containing additives.

2. Description of the Prior Art

Alumina, alpha-monohydrates or boehmites and their dehydrated and or sintered forms are some of the most extensively used aluminum oxide-hydroxides materials. Some of the major commercial applications, for example, ceramics, abrasive materials, fire-retardants, adsorbents, catalysts fillers in composites, and so on, involve one or more forms of these materials. Also, a substantial portion of commercial boehmite aluminas is used in catalytic applications such as refinery catalysts, catalyst for hydroprocessing hydrocarbon feeds, reforming catalysts, pollution control catalysts, cracking catalysts. The term "hydroprocessing" in this context encompasses all processes in which a hydrocarbon feed is reacted with hydrogen at elevated temperature and elevated pressure. These processes include hydrodesulphurisation, hydrodenitrogenation, hydrodemetallisation, hydrodearomatisation, hydroisomerisation, hydrodewaxing, hydrocracking, and hydrocracking under mild pressure conditions, which is commonly referred to as mild hydrocracking. This type of alumina is also used as a catalyst for specific chemical processes such as ethylene-oxide production and methanol synthesis. Relatively more recent commercial uses of boehmite types of aluminas or modified forms thereof involve the transformation of environmentally unfriendly chemical components such as chlorofluorohydrocarbons (CFCs) and other undesirable pollutants. Boehmite alumina types are further used as catalytic material in the combustion of gas turbines for reducing nitrogen oxide.

The main reason for the successful extensive and diversified use of these materials in such variety of commercial uses is their flexibility, which enables them to be tailor-made into products with a very wide range of physical-chemical and mechanical properties.

Some of the main properties which determine the suitability of commercial applications involving gas-solid phase interactions such as catalysts and adsorbents are pore volume, pore size distribution, pore texture, specific density, surface areas, density and type of active center, basicity and acidity, crushing strength, abrasion properties, thermal and hydrothermal aging (sintering), and long-term stability.

By and large, the desired properties of the alumina product can be obtained by selecting and carefully controlling certain parameters. These usually involve: raw materials, impurities, precipitation or conversion process conditions, aging conditions and subsequent thermal treatments (calcination/steaming), and mechanical treatments.

Nevertheless, in spite of this wide and diversified range of existing know-how, this technology is still under development and presents unlimited scientific and technological challenges to both the manufacturers and the end-users for further development of such alumina-based materials.

The term boehmite is used in the industry to describe alumina hydrates which exhibit XRD patterns close to that of aluminum oxide-hydroxide [AlO(OH)], naturally occurring boehmite or diaspore. Further, the general term boehmite tends to be used to describe a wide range of alumina hydrates which contain different amounts of water of hydration, have different surface areas, pore volumes, and specific densities, and exhibit different thermal characteristics upon thermal treatment. Yet although their XRD patterns exhibit the characteristic boehmite [AlO(OH)] peaks, their widths usually vary and they can also shift location. The sharpness of the XRD peaks and their locations have been used to indicate the degree of crystallinity, crystal size, and amount of imperfections.

Broadly, there are two categories of boehmite aluminas. Category I, in general, contains boehmites which have been synthesized and/or aged at temperatures close to 100° C., most of the time under ambient atmospheric pressure. In the present specification, this type of boehmite is referred to as quasi-crystalline boehmite. The second category of boehmites consists of so-called micro-crystalline boehmites.

In the state of the art, category I boehmites, i.e. quasi-crystalline boehmites, are referred to interchangeably as: pseudo-boehmites, gelatinous boehmites or quasi-crystalline boehmites (QCBs). Usually, these QCB aluminas have very high surface areas, large pores and pore volumes, and lower specific densities than micro-crystalline boehmites. They disperse easily in water of acids, have smaller crystal sizes than micro-crystalline boehmites, and contain a larger number of water molecules of hydration. The extent of hydration of the QCB can have a wide range of values, for example from about 1.4 up, and about 2 moles of water per mole of AlO, usually intercalated orderly or otherwise between the octahedral layers.

The DTG (differential thermographimetry) curves of the water release from the QCB materials as a function of temperature show that the major peak appears at much lower temperatures compared to that of the much more crystalline boehmites. The XRD patterns of QCBs show quite broad peaks, and their half-widths are indicative of the crystal size as well as the degree of crystal perfection.

The broadening of the widths at half-maximum intensities varies substantially and for the QCBs typically can be from about 2°–6° to 2θ. Further, as the amount of water intercalated in the QCB crystals is increased, the main (020) XRD reflection moves to lower 2θ values corresponding to greater d-spacings. Some typical, commercially available QCB's are: Condea Pural®, Catapal® and Versale® products.

The category II boehmites consist of micro-crystalline boehmites (MCBs), which are distinguished from the QCBs by their high degree of crystallinity, relatively large crystal sizes, very low surface areas, and high densities. Unlike the QCBs, the MCBs show XRD patterns with higher peak intensities and very narrow half-peak line widths. This is due to the relatively small number of intercalated water molecules, large crystal sizes, higher degree of crystallization of the bulk material, and smaller amount of crystal imperfections present. Typically, the number of intercalated molecules of water can vary from about 1 up to about 1.4 per mole of AlO. The main XRD reflection peaks (020) at half-length of maximum intensity have widths from about 1.5 down to about 0.1 degree 2-theta (2θ). For the purpose of this specification we define quasi-crystalline boehmites as having 020 peak widths at half-length of the maximum intensity of 1.5 or greater than 1.5°. Boehmites having a (020) peak width at half-length of maximum intensity smaller than 2 are considered micro-crystalline boehmites.

A typical commercially available MCB product is Condea's P-200® grade of alumina. Overall, the basic, characteristic differences between the QCB and MCB types of boehmites involve variations in the following: 3-dimensional lattice order, sizes of the crystallites, amount of water intercalated between the octahedral layers, and degree of crystal imperfections.

As for the commercial preparation of these boehmite aluminas, QCBs are most commonly manufactured via processes involving:

Neutralization of aluminum salts by alkalines, acidification of aluminate salts, hydrolysis of aluminum alkoxides, reaction of aluminum metal (amalgamated) with water, and rehydration of amorphous rho-alumina obtained by calcining gibbsite. The MCB types of boehmite aluminas in general are commercially produced by hydrothermal processes using temperatures usually above 150° C. and autogeneous pressures. These processes usually involve hydrolysis of aluminum salts to form gelatinous aluminas, which are subsequently hydrothermally aged in an autoclave at elevated temperatures and pressures. This type of process is described in U.S. Pat. No. 3,357,791. There are several variations on this basic process involving different starting aluminum sources, additions of acids or salts during the aging, and a wide range of process conditions.

MCBs are also prepared using hydrothermal processing of gibbsite. Variations on these processes involve: addition of acids, alkaline metals, and salts during the hydrothermal treatment, as well as the use of boehmite seeds to enhance the conversion of gibbsite to MCB. These types of processes are described in Alcoa's U.S. Pat. No. 5,194,243, in U.S. Pat. No. 4,117,105 and in U.S. Pat. No. 4,797,139.

Nevertheless, whether pseudo-, quasi- or microcrystalline, such boehmite materials are characterized by reflections in their powder X-ray. The ICDD contains entries for boehmite and confirms that there would be reflections corresponding to the (020), (021), and (041) planes. For copper radiation, such reflections would appear at 14, 28, and 38 degrees 2-theta. The various forms of boehmite would be distinguished by the relative intensity and width of the reflections. Various authors have considered the exact position of the reflections in terms of the extent of crystallinity. Nevertheless, lines close to the above positions would be indicative of the presence of one or more types of boehmite phases.

In the prior art, we find QCBs containing metal ions which have been prepared by hydrolysis of alumina isopropoxide with co-precipitation of lanthanides, as described in the paper by J. Medena, *J. Catalysis*, Vol. 37 (1975), 91–100, and J. Wachowski et al., *Materials Chemistiy*, Vol. 37 (1994), 29–38. The products are pseudo-boehmite type aluminas with the occlusion of one or more lanthanide metal ions. These materials have been used primarily in high-temperature commercial applications where the presence of such lanthanide metal ions in the pseudoboehmite structure retards the transformation of the gamma-alumina to the alpha-alumina phase. Therefore, a stabilization of the gamma phase is obtained, i.e. a higher surface area is maintained before conversion to the refractory lower surface area alpha-alumina. Specifically, Wachowski et al. used the lanthanide ions (La, Ce, Pr, Nd, Sm) in quantities from 1% to 10% by weight, calcined at temperatures in the range of 500° C. to 1200° C. No information is provided by Wachowski et al. regarding the state and properties of the materials below 500° C., which is the most important area for catalytic applications.

Also, EP-A1-0 597 738 describes the thermal stabilization of alumina by the addition of lanthanum, optionally combined with neodymium. This material is prepared by aging flash-calcined Gibbsite in a slurry with a lanthanum salt at a temperature between 70 and 110° C., followed by a thermal treatment at a temperature between 100 and 1000° C.

These products, like the products produced by Wachowski et al., all are high-temperature refractory (ceramic) materials which because of their bulk structures of extremely high density, very low surface areas, and small pores find very limited application in heterogeneous catalysis, especially for catalysts used in hydrocarbon conversion or modification, for example FCC and hydroprocessing commercial applications.

Further, EP-A-0 130 835 describes a catalyst comprising a catalytically active metal supported on a lanthanum or neodymium-$\beta$-$Al_2O_3$ carrier. Said carrier is obtained by the precipitation of aluminum nitrate solution with ammonium hydroxide in the presence of a lanthanum, praseodymium or neodymium salt solution. As the precipitated amorphous material is directly washed with water and filtered, the alumina is not allowed to age with time under the usual conditions and a certain pH, concentration, and temperature, so that it crystallizes to a boehmite alumina structure.

SUMMARY OF THE INVENTION

In one embodiment the present invention is directed to quasi-crystalline boehmite wherein an additive is present in a homogeneously dispersed state, said additive not being lanthanide.

In a second embodiment, the present invention is directed to transition alumina wherein additives are present in a homogeneously dispersed state, said additives being compounds containing elements selected from the group of alkaline earth metals, rare earth metals, transition metals, actinides, silicon, boron, titanium, and phosphorus.

Other objectives and embodiments of our invention encompass details about compositions, manufacturing steps, etc., all of which are hereinafter disclosed in the following discussion of each of the facets of the present invention.

BRIEF DESCRIPTION OF THE DRAWINGS

FIG. 1 is an X-ray diffractogram (XRD) for the spectrum of Catapal A® of Vista Chemicals.

FIG. 2 is the XRD pattern of the QCB formed in the procedure of Example 2.

FIG. 3 is the XRD pattern of the QCB formed in the procedure of Example 3.

FIG. 4 is the XRD patter of the QCB formed in the procedure of Example 4.

FIG. 5 is the XRD pattern of the QCB formed in the procedure of Example 10.

FIG. 6 is the XRD pattern of the QCB formed in the procedure of Example 11.

FIG. 7 is the XRD pattern of the MCB formed in the procedure of Example 12.

DETAILED DESCRIPTION OF THE INVENTION

The additive present in the QCB according to the invention helps to adjust the QCB's physical, chemical, and catalytic properties such as specific density, surface area, pore volume, pore size distribution, density and type of active centers, basicity and acidity, crushing strength, abrasion properties, etc., which determine the boehmite's suitability for use in catalytic or absorbent material. The fact that the additive is homogeneously dispersed within the QCB distinguishes the QCBs according to the invention from QCBs which have been impregnated with additives, and renders these new QCBs extremely suitable for catalytic purposes or as starting materials for the preparation of catalysts for heterogeneous catalytic reactions. For the purpose of the invention, it is stated that a homogenous dispersion of the additive is present in the QCB if the X-ray diffraction pattern has no reflections of the additive, and thus the additive is not present as a separate phase. It is, of course, possible to incorporate different types of additives into the QCB according to the invention.

Suitable additives are compounds containing elements selected from the group of alkaline earth metals, alkaline metals, transition metals, noble metals such as Pt and Pd, actinides, silicon, gallium, boron, titanium, zirconium, and phosphorus. For instance, the presence of silicon increases the amount of acidic sites in the boehmite, transition metals introduce catalytic or absorbing activity such as $SO_x$ captivation, $NO_x$ captivation, hydrogenation, hydroconversion, and other catalytic systems for gas/solid interactions.

Suitable compounds containing the desired elements are nitrates, sulfates, chlorides, formates, acetates, carbonates, vanadates, etc. The use of compounds with decomposable anions is preferred, because the resulting QCBs with additive can be dried directly, without any washing, as anions undesirable for catalytic purposes are not present.

In addition to the additives mentioned above, rare earth metal-containing compounds may be present in the quasi-crystalline boehmite, according to the invention.

The QCBs according to the invention can be prepared in several ways. In general, a quasi-crystalline boehmite precursor and an additive are converted to a quasi-crystalline boehmite containing the additive in a homogeneously dispersed state. Examples of suitable preparation processes are described below:

Process 1

The QCB can be prepared by hydrolyzing and aging an aluminum alkoxide in the presence of a compound containing the desired additive(s). The additive can be incorporated during the hydrolysis step or added at the end before the aging step.

Process 2

The QCB can be prepared by hydrolysis and precipitation as hydroxides of soluble aluminum salts and aged to form a QCB containing additive. Examples of suitable aluminum salts are aluminum sulfate, aluminum nitrate, aluminum chloride, sodium aluminate, and mixtures thereof. The additive(s) may be added while the hydrolysis and coprecipitation are going on or at the end in the aging step.

Process 3

The QCB can also be prepared by aging a slurry containing a thermally treated form of aluminum trihydrate and additive(s) at temperatures ranging from 80 to 130° C. for a time sufficient to form QCBs, preferably at a temperature between 90 and 110° C. Thermally treated forms of aluminum trihydrate are calcined aluminum trihydrate and flash calcined aluminum trihydrate (CP® alumina). This preparation method has the advantage that no ions are introduced into the QCB apart from any ions present in the additive compound. That means that with the appropriate choice of additive compounds washing steps can be reduced or avoided altogether. For instance, when decomposable anions (such as carbonates, nitrates, and formates) are used, the QCB containing additive can be dried directly, as cations undesirable for catalytic purposes are not present. A further advantage of this preparation method is that it is possible to first shape a slurry containing a thermally treated form of aluminum trihydrate and additive, reslurry the shaped bodies, and subsequently age the shaped bodies to form QCBs. Shaping is defined in this specification as any method of obtaining particles with the appropriate size and strength for the specific purpose. Suitable shaping methods are spray-drying, extrusion (optionally with intermediate spray-drying, filterpressing, or kneading), pelletizing, beading or any other conventional shaping method used in the catalyst or absorbent field and combinations thereof.

Process 4

The QCB can also be prepared by aging a slurry containing amorphous gel alumina and additive(s) at temperatures ranging from 80 to 130° C., preferably at a temperature between 90 and 110° C., to form QCBs. Like process 3 mentioned above, this preparation method also has the advantage that no ions are introduced into the QCB apart from the ions of the additive compound. This means that with the appropriate choice of additive compounds washing steps can be reduced or avoided altogether. Also, it is possible to first shape a slurry containing amorphous alumina gel and additive, reslurry the shaped bodies, and subsequently age the shaped bodies to form QCBs. In this case care must be taken to choose a shaping step in which the amorphous gel alumina/additive mixture is not heated to a temperature exceeding the aging temperature.

Process 5

QCBs according to the invention can also be prepared by aging a relatively amorphous QCB by thermal or hydrothermal treatment in the presence of compounds of the desired additive to form a QCB containing additive in a homogeneously dispersed state. The crystallinity increases to some extent, but the resulting product is still a QCB according to the definition of the present description. This process also allows shaping of the QCB-additive mixture before the (hydro)thermal treatment. Further, no ions other than the ions of the additive compound are introduced into the QCB.

Process 6

QCBs can also be prepared by aging alumina trihydrates such as gibbsite, BOC, and bayerite by hydrothermal treatment, with the aid of suitable boehmite seeds in the presence of compounds of the desired additives. Suitable seeds are the known seeds to make micro-crystalline boehmite such as commercially available boehmite (Catapal®, Condea® Versal, P-200®, etc.), amorphous seeds, milled boehmite seeds, boehmite prepared from sodium aluminate solutions, etc. Also quasi-crystalline boehmites prepared by one of the processes described here can suitably be used as a seed. Like processes 3, 4, and 5 no ions other than the ions of the additive are introduced into the QCB, and this process allows shaping prior to the aging step.

Although processes 5 and 6 described above are known for the preparation of micro-crystalline boehmites, we found that they can be adapted to form QCBs by adjusting the seed used, the pH, and the hydrothermal conditions.

The first publications on the use of seeds in the hydrothermal conversion of aluminum trihydrate date back in the late 1940's/early 1950's. For example, G. Yamaguchi and K. Sakamato (1959), cleary demonstrate the concept that boehmite seeds substantially improved the kinetics of the hydrothermal conversion of gibbsite to boehmite, by lowering the temperature, shorten the reaction time, and increase the gibbsite conversion.

Also the beneficial principle of seeding with boehmite in the hydrothermal transformation of gibbsite in an autoclave operating at elevated temperatures and autogeneous pressures was also demonstrated clearly by G. Yamaguchi and H. Yamanida (1963).

There are several other publications in the open literature, in which equally well the benefits of seeding with boehmite and/or alkaline solutions are demonstrated. Further, the use of boehmite seed is also claimed to produce finer particle size boehmite product which is easier to disperse in water. The use of boehmite seeds in the hydtrothermal conversion of gibbsite has been described in U.S. Pat. No. 4,797,139, filed on Dec. 16, 1987, and in U.S. Pat. No. 5,194,243, filed on Sep. 30, 1985.

In all the above-described porcesses an intermediate calcination, prior to the aging step may be applied.

All the processes described above may be conducted batch-wise or in a continuous mode, optionally in a continuous multi step operation. The processes may be conducted partly continuous, partly batchwise.

As mentioned above, more than one type of QCB precursor may be used, although care must be taken that the reaction conditions employed enable the conversion of the precursor to QCB. Said mixture of QCB precursors may be prepared before introduction of the additive, or the various types of precursors may be added in any of the further stages of the reaction.

In the processes for the preparation of the QCBs, according to the invention, more than one aging step may be applied, wherein for instance the aging temperature and/or condition (thermally or hydrothermally, pH, time) is varied.

The reaction products of the processes for the preparation of the QCBs, according to the invention, may also be recycled to the reactor.

If more than one type of additive is incorporated into the QCB, the various additives may be added simultaneously or sequentially in any of the reaction steps.

It may be advantageous to add acids or bases to adjust the pH during the hydrolysis, precipitation and/or aging steps.

As mentioned above, some of the processes for the preparation of the quasi-crystalline boehmites, according to the invention, allow shaping into shaped bodies during preparation. It is also possible to shape the final QCB, optionally with the help of binders and/or fillers.

As mentioned above, the QCBs according to the invention are extremely suitable as components or starting material for catalyst compositions or catalyst additives. To this end the QCB is combined with, optionally, binders, fillers (e.g. clay such as kaolin, titanium oxide, zirconia, silica, silica-alumina, bentonite etc.), catalytically active material such as molecular sieves (e.g.ZSM-5, zeolite Y, USY zeolite), and any other catalyst components such as for instance pore regulating additives, which are commonly used in catalyst compositions. For some applications it may be advantageous to neutralize the QCB before use as catalyst component, for instance to improve or create pore volume. Further, it is preferred to remove any sodium to a content below 0.1 wt % $Na_2O$. The present invention therefore is also directed to catalyst compositions and catalyst additives comprising the QCB according to the invention.

In a further embodiment of the invention, the QCB may be mixed with other metal oxides or hydroxides, binders, extenders, activators, etc. in the course of further processing to produce absorbents, ceramics, refractories, substrates, and other carriers.

Boehmites are generally used for catalytic purposes at temperatures between 200 and 1000° C. At these high temperatures the boehmites are usually converted into transition-aluminas. Therefore, the present invention is also directed to transition alumina which is obtainable by thermal treatment of the quasi-crystalline boehmite-containing additive according to the invention and to transition alumina wherein additives not being lanthanides are present in a homogeneously dispersed state. The invention is further directed to transition alumina wherein said additives are compounds containing elements selected from the group of alkaline earth metals, transition metals, actinides, silicon, boron, titanium, and phosphorus.

With the above-mentioned transition aluminas catalyst compositions or catalyst additives can be made, optionally with the help of binder materials, fillers, etc.

The present invention will be further illustrated by means of the following non-limiting examples.

EXAMPLES

Comparative Example 1

An XRD spectrum was made of Catapal A®, ex Vista Chemicals. See FIG. 1.

Example 2

CP® alumina (flash-calcined aluminum trihydrate) was treated with zinc nitrate solution at a temperature of 200° C. for 1 hour, the pH being 4. FIG. 2 shows the XRD pattern of the QCB formed.

Example 3

CP® alumina (flash-calcined aluminum trihydrate) was treated with sodium silicate solution at a temperature of 200° C. for 1 hour, the pH being 4. FIG. 3 shows the XRD pattern of the QCB formed.

Example 4

A QCB was co-precipitated by co-precipitation of aluminum sulfate and sodium aluminate to a final pH of 10 at a temperature of 80° C. in the presence of 10 wt % (calculated as the oxide based on alumina) nickel nitrate and 6 wt % (calculated as the oxide based on the alumina) cobalt nitrate. The reaction product is aged at 80° C. for 48 hours. The resulting slurry was washed with hot dilute ammonium hydroxide (pH 8 to 9). FIG. 4 shows the XRD pattern of the QCB formed.

Example 5

A QCB was co-precipitated by co-precipitation of aluminum sulfate and sodium aluminate to a final pH of 10 at a temperature of 80° C. in the presence of 10 wt % (calculated as the oxide based on the alumina) nickel nitrate. The reaction product is aged at a temperature of 80° C. for 48 hours.

Example 6

A QCB was co-precipitated by co-precipitation of aluminum sulfate and sodium aluminate to a final pH of 10 at a temperature of 80° C. in the presence of 8 wt % (calculated as the oxide based on the alumina) cobalt nitrate. The reaction product is aged at a temperature of 80° C. for 48 hours.

Example 7

A QCB was co-precipitated by co-precipitation of aluminum sulfate and sodium aluminate to a final pH of 10 at a temperature of 80° C. in the presence of 5 wt % (calculated as the oxide based on the alumina) molybdenum nitrate. The reaction product is aged at a temperature of 80° C. for 48 hours.

Example 8

A QCB was co-precipitated by co-precipitation of aluminum sulfate and sodium aluminate to a final pH of 10 at a temperature of 80° C. in the presence of 8 wt % cobalt nitrate and 5 wt % (both calculated as the oxides based on the alumina) molybdenum nitrate. The reaction product is aged at a temperature of 80° C. for 48 hours.

Example 9

A QCB was co-precipitated by co-precipitation of aluminum sulfate and sodium aluminate to a final pH of 10 at a temperature of 80° C. in the presence of 9 wt % nickel nitrate, 8 wt % cobalt nitrate, and 6 wt % molybdenum nitrate (all calculated as the oxides based on the alumina). The reaction product is aged at a temperature of 80° C. for 48 hours.

Example 10

CP® alumina (flash-calcined aluminum trihydrate) was treated with 5% (calculated as the oxide) molybdenum nitrate in solution at a temperature of 90° C. for 18 hours, the pH being kept at 7.7. FIG. 5 shows the XRD pattern of the QCB formed.

Example 11

P3® alumina was treated with 10 wt % (calculated as the oxide) gallium nitrate in solution at a temperature of 90° C. for 18 hours, the pH being kept at 6.1. FIG. 6 shows the XRD pattern of the QCB formed.

Example 12

CP® alumina (flash-calcined aluminum trihydrate) was treated with 5 wt % (calculated as the oxide) barium nitrate in solution at a temperature of 100° C. for 18 hours, the pH being 4.FIG. 7 shows the XRD pattern of the QCB formed.

What is claimed:

1. A composition comprising quasi-crystalline boehmite and an additive present in a homogeneously dispersed state, said additive being selected from the group consisting of alkaline earth metals, transition metals, actinides, noble metals, gallium, boron and phosphorus, and said quasi-crystalline boehmite having a peak width at half length of the maximum intensity of the (020) XRD reflection of 1.5 or greater than 1.5 degrees 2-theta.

2. The composition of claim 1 wherein a rare earth metal-containing compound is also present.

3. A process for the preparation of the quasi-crystalline boehmite of claim 1 wherein a quasi-crystalline boehmite precursor and an additive are converted in a reactor to reaction products comprising a quasi-crystalline boehmite containing an additive in a homogeneously dispersed state.

4. The process of claim 3 wherein the quasi-crystalline boehmite precursor and additive are aged to form a quasi crystalline boehmite containing an additive in a homogeneously dispersed state.

5. The process of claim 4, wherein the quasi-crystalline boehmite precursor and the additive are shaped into a shaped body containing a quasi-crystalline boehmite precursor/additive mixture prior to the aging step.

6. The process of claim 4 wherein more than one aging step is used.

7. The process of claim 3 wherein more than one type of quasi-crystalline boehmite precursor is used.

8. The process of claim 3 wherein aluminum alkoxide is hydrolyzed and aged to form quasi-crystalline boehmite containing additive.

9. The process of claim 3 wherein a soluble aluminum salt is hydrolyzed and precipitated as a hydroxide and aged to form a quasi-crystalline boehmite containing additive.

10. The process of claim 3 wherein thermally treated aluminum trihydrate is rehydrated in water in the presence of an additive and the resulting slurry is aged at a temperature between 80 and 130° C. for a time sufficient to form quasi-crystalline boehmite.

11. The process of claim 3 wherein amorphous gel alumina is slurried in water in the presence of an additive and the resulting slurry is aged at a temperature between 80 and 130° C. for a time sufficient to form quasi-crystalline boehmite.

12. The process of claim 3 wherein quasi-crystalline boehmite precursor is aged by (hydro)thermal treatment in the presence of an additive to form a quasi-crystalline boehmite containing additive in a homogeneously dispersed state.

13. The process of claim 3 wherein aluminum trihydrate is aged by hydrothermal treatment in the presence of an additive to form quasi-crystalline boehmite.

14. The process of claim 3 which is conducted in a continuous mode.

15. The process of claim 3 wherein the reaction products are recycled to the reactor.

16. A shaped particle comprising the composition of claim 1.

17. A catalyst composition comprising the composition of claim 1.

18. The catalyst composition of claim 17 which also comprises a binder material.

19. A transition alumina obtained by thermal treatment of the composition of claim 1.

20. A catalyst composition comprising the transition alumina of claim 19.

21. The catalyst composition of claim 20 which also comprises a binder material.

22. A transition alumina wherein additives are present in a homogeneously dispersed state, said additives being compounds containing elements selected from the group of alkaline earth metals transition metals, actinides, noble metals, gallium, boron and phosphorus.

* * * * *